(12) United States Patent
Ishii

(10) Patent No.: US 11,263,511 B2
(45) Date of Patent: Mar. 1, 2022

(54) NEURAL NETWORK TRAINING DEVICE, NEURAL NETWORK TRAINING METHOD AND STORAGE MEDIUM STORING PROGRAM

(71) Applicant: NEC CORPORATION, Tokyo (JP)

(72) Inventor: Masato Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 818 days.

(21) Appl. No.: 16/078,121

(22) PCT Filed: Feb. 14, 2017

(86) PCT No.: PCT/JP2017/005230
§ 371 (c)(1),
(2) Date: Aug. 21, 2018

(87) PCT Pub. No.: WO2017/145852
PCT Pub. Date: Aug. 31, 2017

(65) Prior Publication Data
US 2021/0192331 A1 Jun. 24, 2021

(30) Foreign Application Priority Data

Feb. 24, 2016 (JP) .............................. JP2016-032806

(51) Int. Cl.
*G06N 3/02* (2006.01)
*G06N 3/04* (2006.01)
*G06N 3/08* (2006.01)

(52) U.S. Cl.
CPC ................. *G06N 3/02* (2013.01); *G06N 3/04* (2013.01); *G06N 3/0481* (2013.01); *G06N 3/08* (2013.01)

(58) Field of Classification Search
CPC .......... G06N 3/02; G06N 3/04; G06N 3/0481; G06N 3/08

(Continued)

(56) References Cited

U.S. PATENT DOCUMENTS

| 8,234,228 B2 * | 7/2012 | Weston ................. G06K 9/6251 706/20 |
| 2014/0067738 A1 * | 3/2014 | Kingsbury ............... G06N 3/08 706/20 |
| 2017/0103308 A1 * | 4/2017 | Chang ...................... G06N 3/04 |

FOREIGN PATENT DOCUMENTS

| JP | 8-202674 A | 8/1996 |
| JP | 2001-142864 A | 5/2001 |

OTHER PUBLICATIONS

Yoshua Bengio, "Practical Recommendations for Gradient-Based Training of Deep Architectures," Neural Networks: Tricks of the Trade, 2nd Edition, vol. 7700 of the series Lecture Notes in Computer Science, 2012, pp. 437-478.

(Continued)

*Primary Examiner* — Shane D Woolwine
(74) *Attorney, Agent, or Firm* — Sughrue Mion, PLLC

(57) ABSTRACT

A neural network training device according to an exemplary aspect of the present invention includes: a memory that stores a set of instructions; and at least one central processing unit (CPU) configured to execute the set of instructions to: determine a regularization strength for each layer, based on an initialized network; and train a network, based on the initialized network and the determined regularization strength, wherein the at least one CPU is further configured to determine the regularization strength in such a way that a difference between magnitude of a parameter update amount calculated from a loss function and magnitude of a parameter update amount calculated from a regularization term falls within a predetermined range.

11 Claims, 5 Drawing Sheets

(58) Field of Classification Search
USPC .......................................................... 711/20
See application file for complete search history.

(56) References Cited

OTHER PUBLICATIONS

Kazumi Saito, "A New Regularization Based on the MDL Principle", Journal of The Japanese Society for Artificial Intelligence, Jan. 1, 1998, pp. 123-130, vol. 13 No. 1.
Chi Dung Doan, "Generalization for Multilayer Neural Network Bayesian Regularization or Early Stopping", proceedings of Asia Pacific Association of Hydrology and Water Resources 2nd Conference, Asia Pacific Association of Hydrology and Water Resources [Online], Jul. 8, 2004 [Search Date: Mar. 28, 2017], Internet: <URL: http://rwes.dpri.kyoto-u.ac.jp/~tanaka/APHW/APHW2004/proceedings/FWR/56-FWR-M185/56-FWR-M185%20(1).pdf>.
Written Opinion for PCT/JP2017/005230, dated Apr. 18, 2017.
International Search Report for PCT/JP2017/005230, dated Apr. 18, 2017.

\* cited by examiner

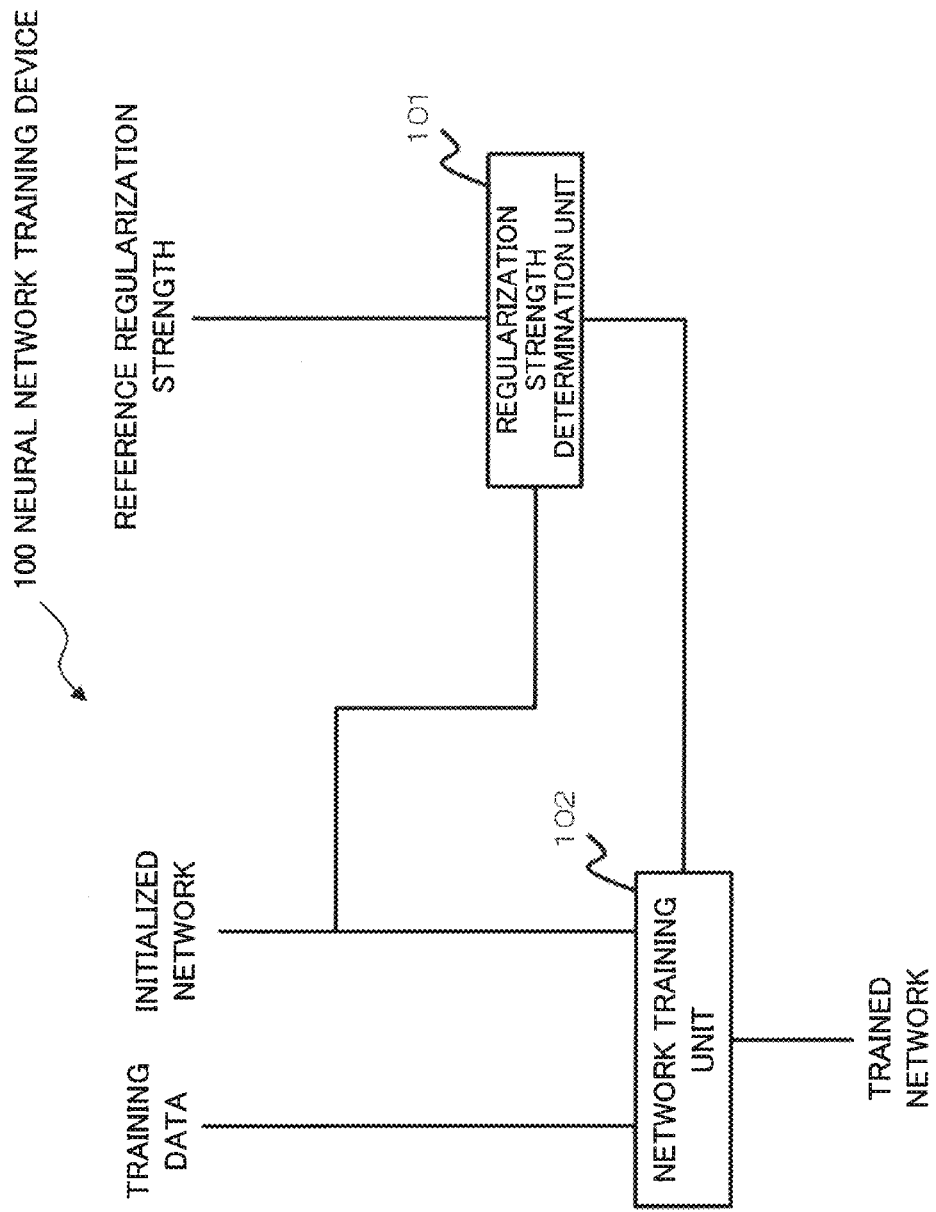

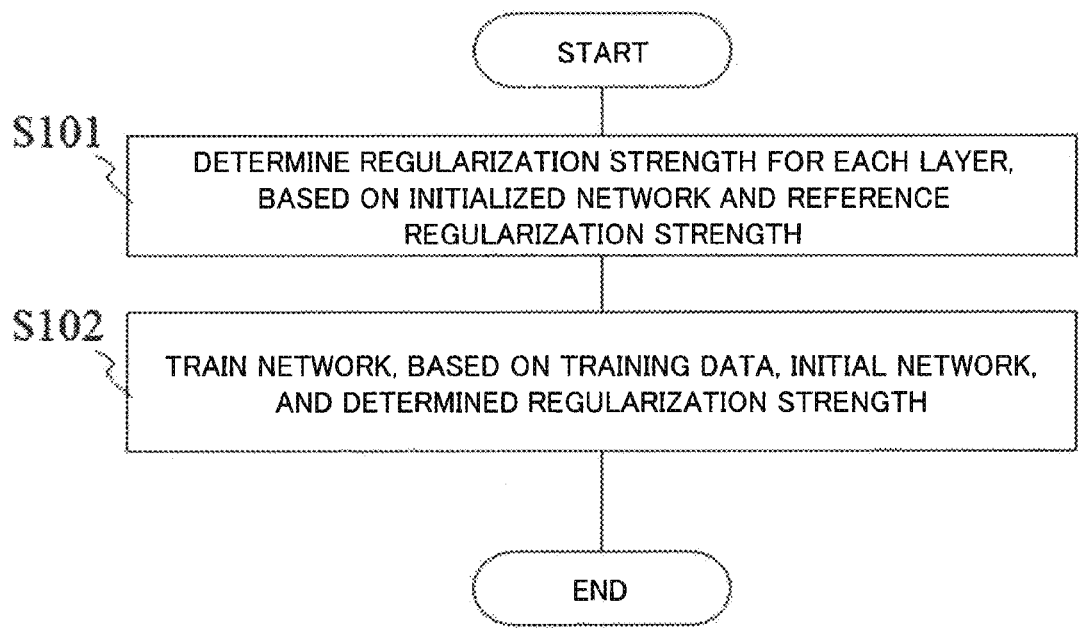

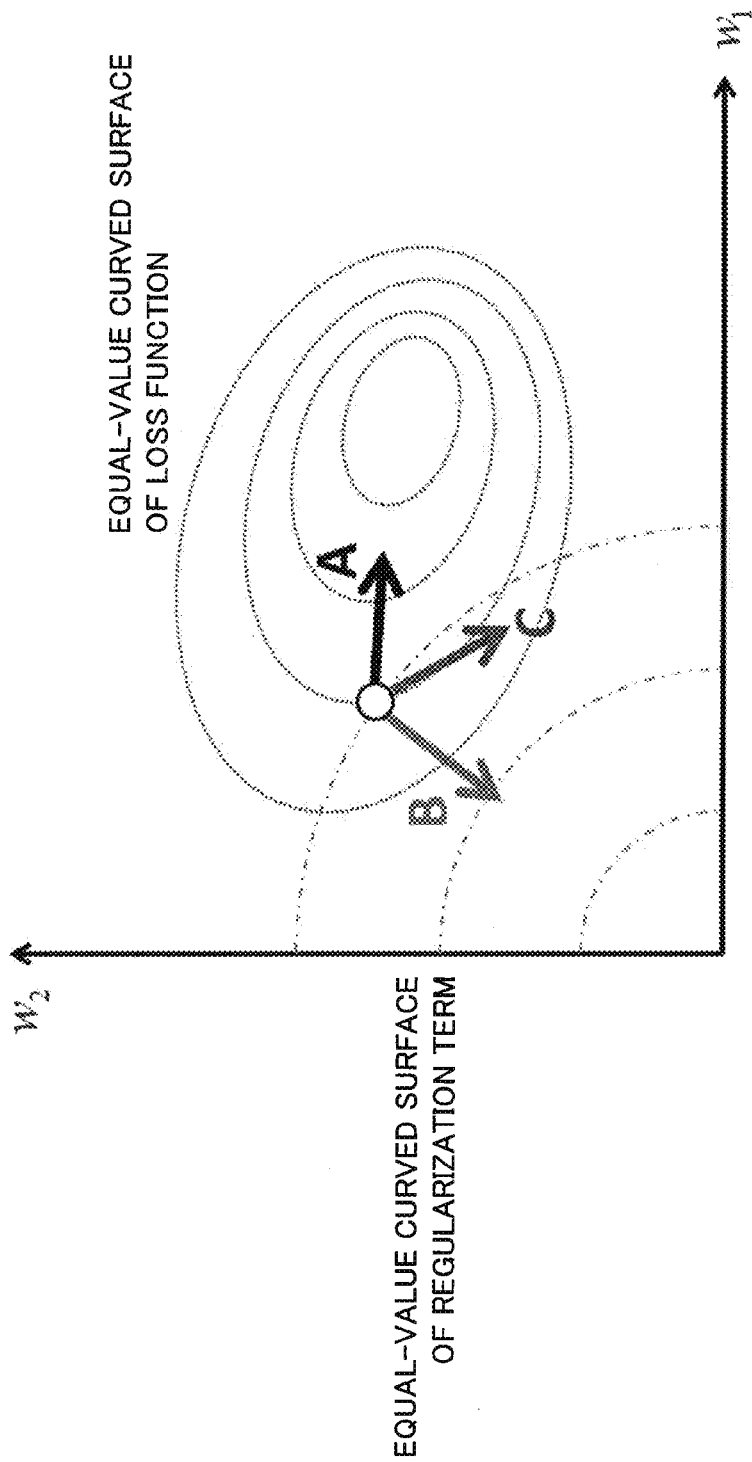

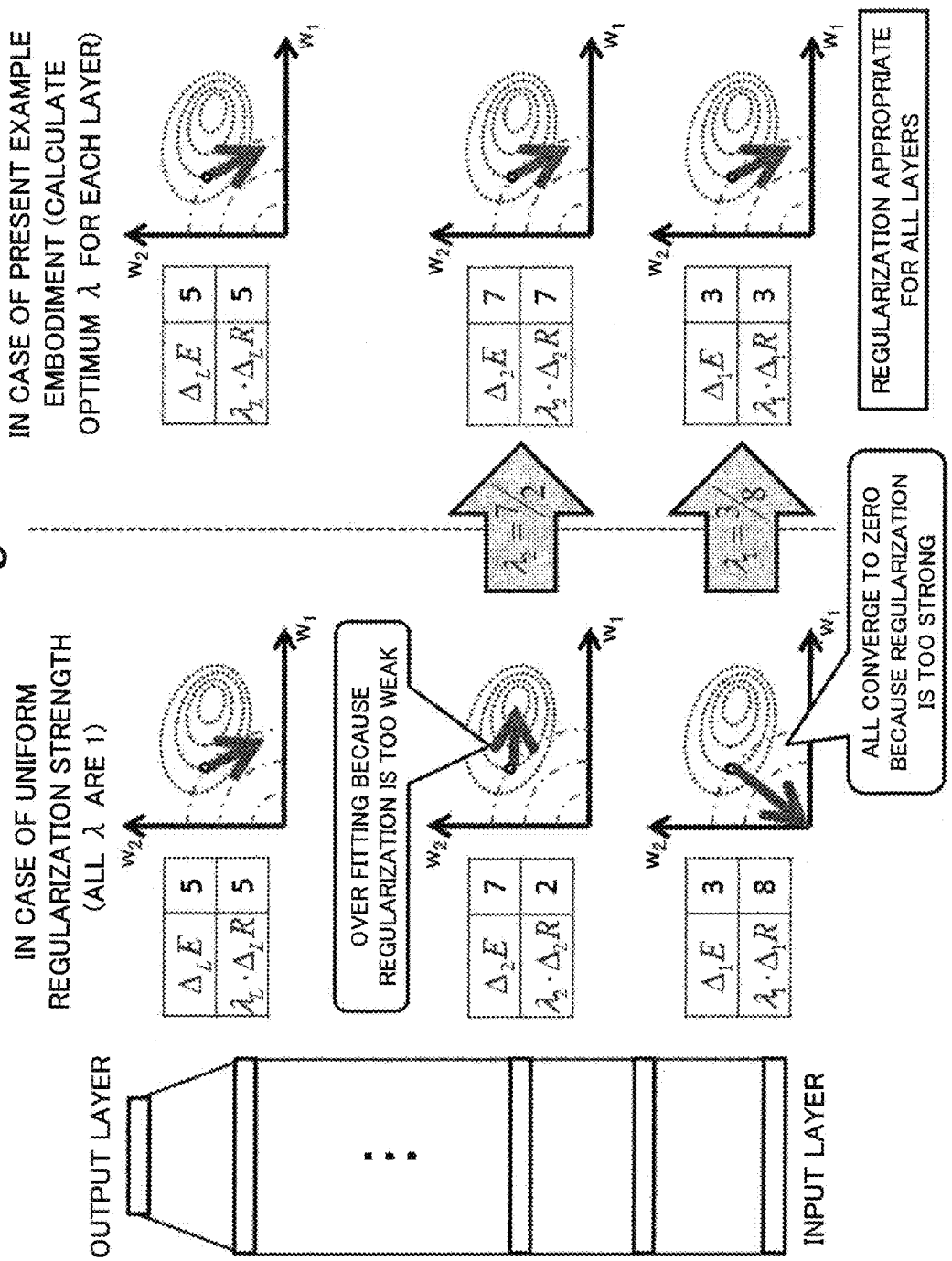

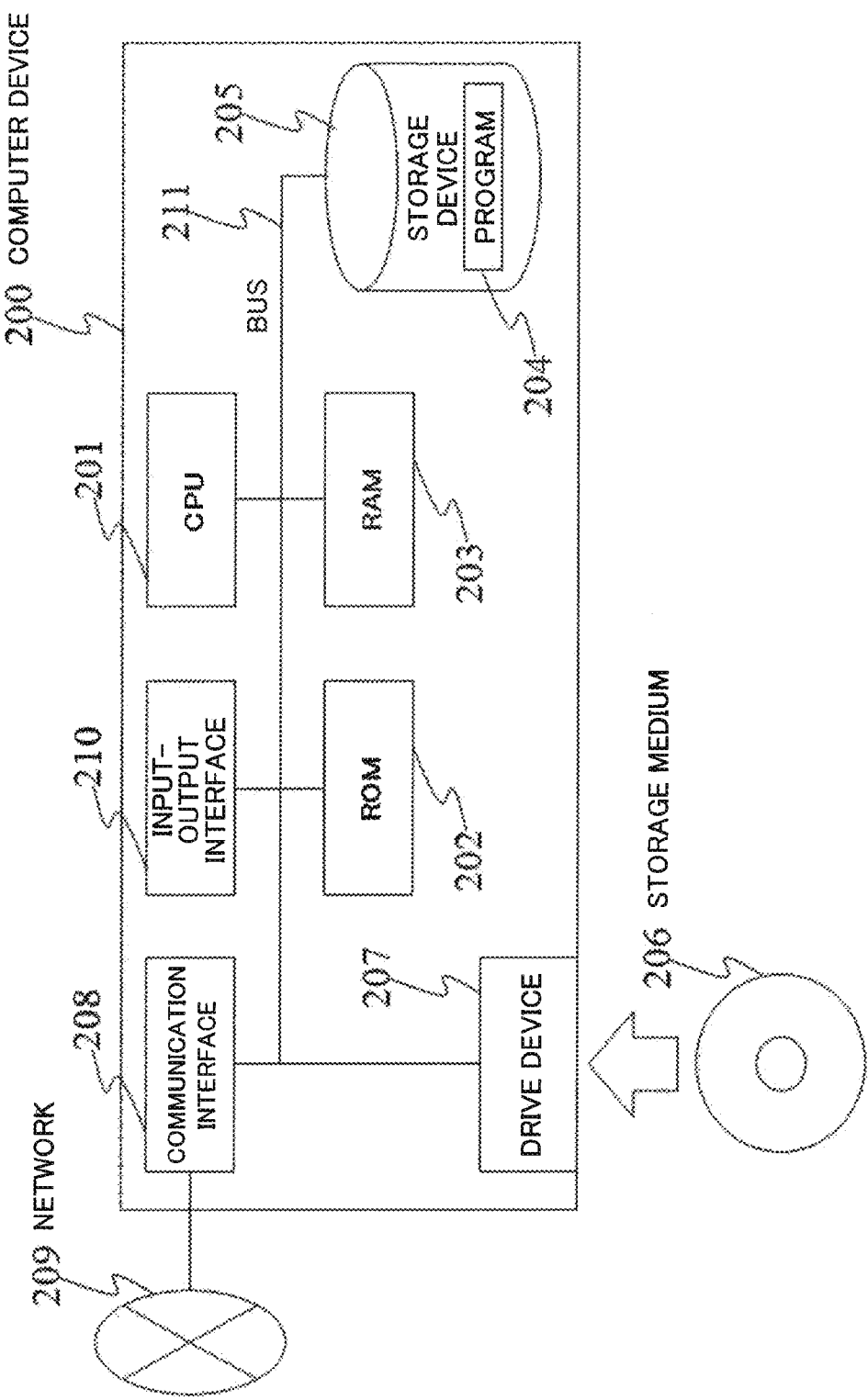

NEURAL NETWORK TRAINING DEVICE, NEURAL NETWORK TRAINING METHOD AND STORAGE MEDIUM STORING PROGRAM

CROSS REFERENCE TO RELATED APPLICATIONS

This Application is a National Stage of International Application No. PCT/JP2017/005230 filed Feb. 14, 2017, claiming priority based on Japanese Patent Application No. 2016-032806 filed Feb. 24, 2016, the disclosure of which is incorporated herein in its entirety

TECHNICAL FIELD

The present invention relates to a neural network training device, a neural network training method, and a program, and particularly relates to a device, a method, and a storage medium storing a program, for efficiently training a network even in the case of a deep network.

BACKGROUND ART

A pattern recognition technique is a technique for estimating which class an input pattern belongs to. Specific examples of the pattern recognition include object recognition of estimating an object from an input image, audio recognition of estimating utterance contents from an input audio, and the like.

As the pattern recognition technique, statistical machine learning is widely used. Particularly, it is known that, in neural networks, it becomes possible to train a deep network in recent years by development of a learning technique referred to as deep learning, and robust recognition of varying input patterns can be performed.

In training a deep network, regularization is generally performed, but it is difficult to set an appropriate regularization strength. The regularization is a process for preventing a parameter to be trained from taking an extreme value, in order to avoid excess learning.

NPL 1 discloses a technique relating to learning of a neural network. In the technique disclosed in NPL 1, for example, L2 regularization in which a sum of squares of parameters is set as a regularization term is used, and training is performed in such a way as to decrease a sum of a loss function and the regularization term.

CITATION LIST

Non Patent Literature

[NPL 1] Yoshua Bengio, "Practical Recommendations for Gradient-Based Training of Deep Architectures," Neural Networks: Tricks of the Trade, 2nd Edition, Volume 7700 of the series Lecture Notes in Computer Science, pages 437 to 478, 2012.

SUMMARY OF INVENTION

Technical Problem

For example, an influence of magnitude of regularization on learning is described with reference to FIG. 3. FIG. 3 is a diagram illustrating one example of an effect of the regularization term. For simplicity, a case of two parameters w1 and w2 is assumed. When regularization is too weak, the parameters are updated in a direction (e.g. A in FIG. 3) of decreasing only the loss function, and over fitting occurs. Conversely, when regularization is too strong, the parameters are updated in a direction (e.g. B in FIG. 3) of decreasing only the regularization term, many parameters converge to zero, and learning does not proceed. Thus, the updating direction needs to be adjusted (e.g. C in FIG. 3) by appropriately setting magnitude of regularization, and the updating needs to be performed in such a way as to prevent any of the foregoing problems.

According to the technique disclosed in NPL 1, regularization of a uniform strength is performed for all layers, but in such regularization, some layers are regularized too strongly and some layers are regularized too weakly. This is because, when a gradient algorithm is used in learning for example, at a time of updating a network in learning, magnitude of a gradient of the loss function depends on scales of all layers above an updating target due to backward propagation of errors, but magnitude of a gradient of the regularization term depends only on a scale of the updating target layer itself, and therefore, the ratio of these two is not uniform between layers. Thus, as illustrated at a column on the left side in FIG. 4, in the technique disclosed in NPL 1, according to regularization of a uniform strength for all layers, over fitting occurs at some of the layers because of too weak regularization, learning does not proceed at some of the layers because of too strong regularization, and therefore, it is difficult to properly train a deep network. Even when regularization intensities for all layers are set individually and manually, since the number of layers is large in a deep network, the number of combinations of regularization intensities to be attempted becomes enormous, and it is not practical to determine an optimum regularization strength for each layer.

An object of the present invention is to provide a neural network training device, a neural network training method, and a program that resolve the above-described issues and efficiently train an entire network.

Solution to Problem

A neural network training device according to an exemplary aspect of the present invention includes: regularization strength determination means for determining a regularization strength for each layer, based on an initialized network; and network training means for training a network, based on the initialized network and the regularization strength determined by the regularization strength determination means, wherein the regularization strength determination means determines the regularization strength in such a way that a difference between magnitude of a parameter update amount calculated from a loss function and magnitude of a parameter update amount calculated from a regularization term falls within a predetermined range.

A neural network training method according to an exemplary aspect of the present invention includes: determining a regularization strength for each layer, based on an initialized network; training a network, based on the initialized network and the regularization strength determined; and determining the regularization strength in such a way that a difference between magnitude of a parameter update amount calculated from a loss function and magnitude of a parameter update amount calculated from a regularization term falls within a predetermined range.

A program according to an exemplary aspect of the present invention causes a computer to perform: a regularization strength determination process of determining a regularization strength for each layer, based on an initialized network; and a training process of training a network, based on the initialized network and the regularization strength determined, wherein he regularization strength determination process determines the regularization strength in such a way that a difference between magnitude of a parameter update amount calculated from a loss function and magnitude of a parameter update amount calculated from a regularization term falls within a predetermined range. The present invention can be achieved by a storage medium that stores the program described above.

Advantageous Effects of Invention

According to the present invention, an entire network can be efficiently trained.

BRIEF DESCRIPTION OF DRAWINGS

FIG. 1 is a block diagram illustrating a functional configuration of a neural network training device according to an example embodiment of the present invention.

FIG. 2 is a flowchart illustrating an operation of the neural network training device according to an example embodiment of the present invention.

FIG. 3 is a diagram illustrating one example of an effect of a regularization term.

FIG. 4 is a diagram illustrating one example of regularization of intensities optimum for respective layers of a network in an example embodiment of the present invention.

FIG. 5 is a block diagram illustrating a hardware configuration of a computer device that implements the neural network training device according to an example embodiment of the present invention.

EXAMPLE EMBODIMENTS

Hereinafter, an example embodiment of the present invention, and modified examples of the example embodiment are described with reference to the drawings, however, the present invention is not limited to the present example embodiment and the present modified examples. In the drawings described below, the same reference signs are assigned to elements having the same functions, and the redundant description thereof is omitted in some cases.

Hardware constituting a neural network training device 100 according to an example embodiment of the present invention is described with reference to FIG. 5. FIG. 5 is a block diagram illustrating a hardware configuration of a computer device 200 that implements the neural network training device 100 according to an example embodiment of the present invention. Note that in the example embodiment of the present invention, each constituent element of the neural network training device 100 represents a functional unit block. Each constituent element of the neural network training device 100 can be implemented by any combination of software and the computer device 200 as illustrated in FIG. 5, for example.

As illustrated in FIG. 5, the computer device 200 includes a central processing unit (CPU) 201, a read only memory (ROM) 202, a random access memory (RAM) 203, a storage device 205, a drive device 207, a communication interface 208, an input-output interface 210, and a bus 211.

The storage device 205 stores a program 204. The drive device 207 performs reading from and writing in a storage medium 206. The communication interface 208 is connected to a network 209. The input-output interface 210 performs input and output of data. The bus 211 connects each constituent elements.

The CPU 201 executes the program 204 by using the RAM 203. The program 204 may be stored in the ROM 202. Alternatively, the program 204 may be stored in the storage medium 206, and be read by the drive device 207, or may be transmitted from an external device via the network 209. The communication interface 208 transmits and receives data to and from external devices via the network 209. The input-output interface 210 transmits and receives data to and from peripheral devices (e.g. a keyboard, a mouse, and a display device). The communication interface 208 and the input-output interface 210 can function as a means for acquiring or outputting data. Data such as output information may be stored in the storage device 205, or may be included in the program 204.

There are various modified examples of methods for implementing each device according to the example embodiment of the present invention. For example, each device according to the example embodiment of the present invention can be implemented as a dedicated device. Alternatively, each device according to the example embodiment of the present invention can be implemented by a combination of a plurality of devices communicably connected to each other.

The scope of the example embodiment of the present invention also includes a processing method in which a program causing the elements of the example embodiment to operate in such a way as to implement the below-described functions of the example embodiment of the present invention (more specifically, a program causing a computer to perform processes illustrated in FIG. 2 and the like) is stored in a storage medium, and the program stored in the storage medium is read out as codes and executed by the computer. In other words, the computer-readable storage medium is also included in the scope of the example embodiment. Further, not only the storage medium in which the above-described program has been recorded, but also the program itself is included in the example embodiment of the present invention.

What can be used as the storage medium are, for example, a floppy (registered trademark) disk, a hard disk, an optical disk, a magneto-optical disk, a compact disc (CD) ROM, a magnetic tape, a nonvolatile memory card, and a ROM. Further, the scope of the present example embodiment includes not only the program performing processes singly by codes stored in the storage medium, but also the program operating on an operating system (OS) in cooperation with functions of other software and an extension board.

Next, the functions of the neural network training device 100 according to an example embodiment of the present invention are described. FIG. 1 is a block diagram illustrating a functional configuration of the neural network training device 100 according to an example embodiment of the present invention. The blocks illustrated in FIG. 1 may be implemented in a single device or may be implemented in distributed devices. Transmission and reception of data between the blocks may be performed via any medium such as a data bus, a network, or a portable storage medium.

As illustrated in FIG. 1, the neural network training device 100 according to the present example embodiment includes a regularization strength determination unit 101 that determines a regularization strength for each layer, based on an initialized network, and a network training unit 102 that trains the initialized network at the regularization strength determined by the regularization strength determination unit 101.

Next, an operation of the neural network training device 100 according to the present example embodiment is described. FIG. 2 is a flowchart illustrating an operation example of the neural network training device 100 according to the example embodiment of the present invention. The regularization strength determination unit 101 determines a regularization strength for each layer, based on an initialized network and a reference regularization strength, and outputs the determined regularization intensities to the network training unit 102 (step S101). The network training unit 102 trains the network, based on training data, the initial network, and the regularization intensities input from the regularization strength determination unit 101, and outputs the trained network (step S102).

Hereinafter, the operation of the neural network training device 100 according to the example embodiment of the present invention is described by using a specific example.

The regularization strength determination unit 101 calculates an appropriate regularization strength for each layer, based on an initialized network. In the present example, the regularization strength determination unit 101 uses a gradient method in learning, and determines regularization intensities by using as a reference a regularization strength for the last layer in such a way that a ratio between variance of a gradient of a loss function and variance of a gradient of a regularization term is equalized at each layer. Here, when variance of a gradient of the loss function concerning a parameter $W_k$ for the k-th layer is $\Delta_k E$, and variance of a gradient of the regularization term is $\Delta_k R$, the regularization strength determination unit 101 determines a regularization strength $\lambda_k$ for the k-th layer in such a way as to satisfy the following. In the following equation, L is the number of the bottom layer. The symbol $\Delta_L E$ represents variance of a gradient of the loss function concerning a parameter $W_L$ for the bottom layer (i.e., the L-th layer). The symbol $\Delta_L R$ represents variance of a gradient of the regularization term of the L-th layer.

$$\frac{\lambda_k \cdot \Delta_k R}{\Delta_k E} = \frac{\lambda_L \cdot \Delta_L R}{\Delta_L E} \quad \text{[Math. 1]}$$

The description is made with reference to FIG. 4, for example. FIG. 4 is a diagram illustrating one example of regularization at an optimum strength for each layer of the network in the example embodiment of the present invention. In the example illustrated in FIG. 4, the right side in Math. 1 is "5/5=1". When all of $\lambda_k$ are 1, the left side in Math. 1 in the case of "k=1" is 3/8 as illustrated on the left side in FIG. 4. Further, the left side in the Math. 1 in the case of "k=2" is 7/2 as illustrated on the left side in FIG. 4. In this case, determining $\lambda_k$ in such a way that "$\lambda_k \cdot \Delta_k R / \Delta_k E = 1$" holds for each layer results in "$\lambda_1 = 3/8$" and "$\lambda_2 = 7/2$". In this way, magnitude of a gradient of the loss function and magnitude of a gradient of the regularization term becomes equal at each layer, and thus, an entire network can be efficiently trained with regularization of which the effectiveness is unchanged from layer to layer. A regularization strength $\lambda_L$ for the last layer is specified as input to the neural network training device 100 according to the example embodiment of the present invention. Adjusting this enables appropriate training of all the layers. The regularization strength determination unit 101 determines a regularization strength $\lambda_L$ in such a way that the ratio is made constant in the present example, but may determine the regularization strength $\lambda_L$ in such a way that the difference is made constant, or may determine the regularization strength $\lambda_L$ in such a way that the ratio or the difference is inconstant and is made to fall within a range determined in advance. Further, the regularization strength as the reference does not need to be a strength for the last layer, and may be a strength for any layer.

The network training unit 102 trains a network by using training data, an initialized network, and regularization intensities determined by the regularization strength determination unit 101. The network training unit 102 uses, for training, backpropagation, which is generally well known, or the like.

As described above, in the neural network training device 100 according to the present example embodiment, the regularization strength determination unit 101 determines a regularization strength for each layer, based on an initialized network and a reference regularization strength, and the network training unit 102 trains a network, based on training data, the initial network, and the determined regularization intensities, and outputs the trained network.

In this way, the neural network training device 100 can set an appropriate regularization strength for each layer, based on a structure of a network, and thus, can train the entire network efficiently.

An advantage of the present example embodiment lies in that appropriate regularization is performed at the time of network training and an entire network can be efficiently trained. This is because an appropriate regularization strength is set for each layer. When a network is trained, parameters of the network are updated based on a parameter update amount calculated from a loss function and a parameter update amount calculated from a regularization term; however, magnitude of both varies depending on layers. The regularization strength determination unit 101 in the present example embodiment determines regularization intensities in such a way that a difference between the magnitude of the update amount based on the loss function and the magnitude of the update amount based on the regularization term falls within a fixed range at each layer. In this way, as illustrated in the right column in FIG. 4, a balance between the magnitude of the update amount based on the loss function and the magnitude of the update amount based on the regularization term becomes equal at all the layers, and thus, an entire network can be efficiently trained with regularization that is not becoming too strong or too weak depending on layers.

Modified Example of Example Embodiment of Present Invention

Next, a modified example of the example embodiment of the present invention is described.

In the above-described example embodiment, the regularization strength determination unit 101 determines a regularization strength for each layer in order that a ratio between magnitude of a gradient of a loss function and magnitude of a gradient of a regularization term is made constant, but conversely in the present modified example, the regularization strength determination unit 101 may make a regularization strength constant, and multiply a gradient of a loss function by a coefficient. In this case, the network training unit 102 uses, as the coefficient, a reciprocal of a regularization strength calculated by the regularization strength determination unit 101.

The example embodiment of the present invention can be used for identifying a pattern as in face recognition and object recognition for example, in image processing or audio processing. In this case, a pattern recognition device that performs recognition, based on a neural network trained by using the neural network training device is used.

A part or all of the above-described example embodiment can be described also as in the following supplementary notes, but are not limited to the following.

Supplementary Note 1

A neural network training device comprising:
regularization strength determination means for determining a regularization strength for each layer, based on an initialized network; and
network training means for training a network, based on the initialized network and the regularization strength determined by the regularization strength determination means, wherein
the regularization strength determination means determines the regularization strength in such a way that a difference between magnitude of a parameter update amount calculated from a loss function and magnitude of a parameter update amount calculated from a regularization term falls within a predetermined range.

Supplementary Note 2

The neural network training device according to Supplementary Note 1, wherein
the regularization strength determination means determines the regularization strength in such a way that a ratio between magnitude of a gradient of the loss function and magnitude of a gradient of the regularization term falls within a predetermined range.

Supplementary Note 3

The neural network training device according to Supplementary Note 1, wherein
the regularization strength determination means determines the regularization strength in such a way that a difference between magnitude of a gradient of the loss function and magnitude of a gradient of the regularization term falls within a predetermined range.

Supplementary Note 4

A pattern recognition device that performs recognition, based on a neural network trained by using the neural network training device according to any one of Supplementary Notes 1 to 3.

Supplementary Note 5

A neural network training method comprising:
determining a regularization strength for each layer, based on an initialized network;
training a network, based on the initialized network and the regularization strength determined; and
determining the regularization strength in such a way that a difference between magnitude of a parameter update amount calculated from a loss function and magnitude of a parameter update amount calculated from a regularization term falls within a predetermined range.

Supplementary Note 6

The neural network training method according to Supplementary Note 5, wherein
the regularization strength is determined in such a way that a ratio between magnitude of a gradient of the loss function and magnitude of a gradient of the regularization term falls within a predetermined range.

Supplementary Note 7

The neural network training method according to Supplementary Note 5, wherein
the regularization strength is determined in such a way that a difference between magnitude of a gradient of the loss function and magnitude of a gradient of the regularization term falls within a predetermined range.

Supplementary Note 8

A pattern recognition method that performs recognition, based on a neural network trained by using the neural network training method according to any one of Supplementary Notes 5 to 7.

Supplementary Note 9

A storage medium that stores a program causing a computer to perform:
a regularization strength determination process of determining a regularization strength for each layer, based on an initialized network; and
a training process of training a network, based on the initialized network and the regularization strength determined, wherein
the regularization strength determination process determines the regularization strength in such a way that a difference between magnitude of a parameter update amount calculated from a loss function and magnitude of a parameter update amount calculated from a regularization term falls within a predetermined range.

Supplementary Note 10

The storage medium according to Supplementary Note 9, wherein
the regularization strength determination process determines the regularization strength in such a way that a ratio between magnitude of a gradient of the loss function and magnitude of a gradient of the regularization term falls within a predetermined range.

Supplementary Note 11

The storage medium according to Supplementary Note 9, wherein
the regularization strength determination process determines the regularization strength in such a way that a difference between magnitude of a gradient of the loss function and magnitude of a gradient of the regularization term falls within a predetermined range.

The present invention is not limited to the above-described example embodiment. Various types of modifications of the present invention that can be understood by those skilled in the art can be made within the scope that does not depart from the essence of the present invention.

REFERENCE SIGNS LIST

100 Neural network training device
101 Regularization strength determination unit
102 Network training unit
200 Computer device
201 CPU
202 ROM
203 RAM 204 Program
205 Storage device
206 Storage medium
207 Drive device
208 Communication interface
209 Network
210 Input-output interface
211 Bus

The invention claimed is:

1. A neural network training device comprising:
a memory that stores a set of instructions; and
at least one central processing unit (CPU) configured to execute the set of instructions to:
determine a regularization strength for each layer of a neural network, based on an initialized neural network; and
train the neural network, based on the initialized neural network and the determined regularization strength, wherein
the at least one CPU is further configured to determine the regularization strength in such a way that a difference between a magnitude of a parameter update amount calculated from a loss function and a magnitude of a parameter update amount calculated from a regularization term falls within a predetermined range.

2. The neural network training device according to claim 1, wherein
the at least one CPU is further configured to determine the regularization strength in such a way that a ratio between a magnitude of a gradient of the loss function and a magnitude of a gradient of the regularization term falls within a predetermined range.

3. The neural network training device according to claim 1, wherein
the at least one CPU is further configured to determine the regularization strength in such a way that a difference between a magnitude of a gradient of the loss function and a magnitude of a gradient of the regularization term falls within a predetermined range.

4. A pattern recognition device that performs recognition, based on the neural network trained by using the neural network training device according to claim 1.

5. A neural network training method comprising: determining a regularization strength for each layer of a neural network, based on an initialized neural network; training the neural network, based on the initialized neural network and the regularization strength determined; and determining the regularization strength in such a way that a difference between a magnitude of a parameter update amount calculated from a loss function and a magnitude of a parameter update amount calculated from a regularization term falls within a predetermined range.

6. The neural network training method according to claim 5, wherein
the regularization strength is determined in such a way that a ratio between a magnitude of a gradient of the loss function and a magnitude of a gradient of the regularization term falls within a predetermined range.

7. The neural network training method according to claim 5, wherein
the regularization strength is determined in such a way that a difference between a magnitude of a gradient of the loss function and a magnitude of a gradient of the regularization term falls within a predetermined range.

8. A pattern recognition method that performs recognition, based on the neural network trained by using the neural network training method according to claim 5.

9. A non-transitory computer readable storage medium that stores a program causing a computer to perform: a regularization strength determination process of determining a regularization strength for each layer of a neural network, based on an initialized neural network; and a training process of training the neural network, based on the initialized neural network and the regularization strength determined, wherein the regularization strength determination process determines the regularization strength in such a way that a difference between a magnitude of a parameter update amount calculated from a loss function and a magnitude of a parameter update amount calculated from a regularization term falls within a predetermined range.

10. The storage medium according to claim 9, wherein
the regularization strength determination process determines the regularization strength in such a way that a ratio between a magnitude of a gradient of the loss function and a magnitude of a gradient of the regularization term falls within a predetermined range.

11. The storage medium according to claim 9, wherein
the regularization strength determination process determines the regularization strength in such a way that a difference between a magnitude of a gradient of the loss function and a magnitude of a gradient of the regularization term falls within a predetermined range.

* * * * *